Sept. 5, 1967  B. BARENYI  3,339,813
LUGGAGE CARRIER
Filed July 15, 1965  2 Sheets-Sheet 1

INVENTOR
BELA BARENYI

BY

ATTORNEYS

Sept. 5, 1967  B. BARENYI  3,339,813
LUGGAGE CARRIER
Filed July 15, 1965  2 Sheets-Sheet 2

INVENTOR
BELA BARENYI

BY *Dicke & Craig*

ATTORNEYS

United States Patent Office 3,339,813
Patented Sept. 5, 1967

3,339,813
LUGGAGE CARRIER
Bela Barenyi, Stuttgart-Vaihingen, Germany, assignor to Daimler-Benz, Aktiengesellschaft, Stuttgart-Unterturkheim, Germany
Filed July 15, 1965, Ser. No. 472,089
Claims priority, application Germany, July 15, 1964, D 44,944
7 Claims. (Cl. 224—42.1)

The present invention relates to a removable roof luggage carrier for motor vehicles.

A large number of roof luggage carriers for motor vehicles, especially for passenger motor vehicles are known in the prior art which, as a rule, consist of a tubular framework that is provided with straight or upwardly curved, i.e., convexly arched cross bars or stays on which are secured longitudinally disposed slats or boards. The cross bars or stays carrying these slats or boards are stressed in bending and have to be constructed relatively sturdily in order to be able to carry the loads placed upon the luggage carrier. The prior art luggage carriers are made of a large number of parts and are, therefore, complicated and expensive in the manufacture and additionally cause considerable wind noises.

The present invention aims at making available a roof luggage carrier which can be manufactured in a simple manner and can be loaded very highly.

The present invention essentially consists in that the roof luggage carrier is provided with a concavely curved unitary shell as base body having an angularly bent web surrounding the shell on all sides. Such a base body is simple and may be manufactured inexpensively. Only tensional stresses occur in the support surface of a roof luggage carrier made in this manner when under load. The danger of a bending or buckling through in the downward direction, which exists in particular with the straight or upwardly curved luggage carriers, is completely avoided. The angularly bent rim surrounding the shell effects a considerable reinforcement of the entire base body. Such a shell can be made of metal or with advantage of plastic material.

According to a further feature of the present invention, provision is made that the luggage carrier closes a roof aperture and carries air supply and air discharge apertures and/or interior and exterior lights. Such a roof luggage carrier can be made of transparent plastic material yet still exhibits nevertheless such a large sturdiness and rigidity that completely filled suitcases may be placed thereon. If the luggage carrier consists of transparent material, it permits light to enter into the passenger interior space through a roof aperture in the unloaded condition. By reason of its particular shape, the aforementioned air supply and air discharge apertures may be readily arranged in and accommodated at the luggage carrier according to the present invention. Furthermore, the spaces formed at the rim offer favorable possibilities for the accommodation of an interior lighting or exterior lighting such as parking lights, turn-indicator lights, positioning lights or the like.

According to a still further feature of the present invention, provision may be made that inner tubular frameworks are arranged at both longitudinal sides on the luggage carrier by means of which the luggage carrier is supported on the roof and by means of which it may also be possibly secured at the roof.

Accordingly, it is an object of the present invention to provide a roof luggage carrier for vehicles, especially passenger motor vehicles which eliminates the aforementioned shortcomings and drawbacks encountered with the prior art constructions in a simple and expeditious manner.

Another object of the present invention resides in a roof luggage carrier for passenger motor vehicles which is simple in construction, easy to install and dismantle, yet involves relatively low costs in manufacture thereof.

A further object of the present invention resides in the provision of a roof luggage carrier which avoids complicated and expensive tubular frameworks, yet, is so constructed and arranged as to afford favorable stress conditions when loaded.

Another object of the present invention resides in the provision of a roof luggage carrier for passenger motor vehicles which not only is made of few parts utilizing a unitary single shell construction but also reduces wind noises while driving the vehicle and permits high loads to be placed thereon without danger of failure of the parts of the roof carrier.

Still a further object of the present invention resides in the provision of a unitary shell-like roof luggage carrier forming the base body thereof which is so constructed as to include built-in reinforcements to avoid all but tensional stresses.

Another object of the present invention resides in the provision of a strong and sturdy roof luggage carrier which may be readily made of metal or preferably of plastic material, especially transparent plastic material to permit light to enter into the passenger space of the motor vehicle through a roof aperture in the absence of luggage on the luggage carrier.

These and other features, objects and advantages of the present invention will become more obvious from the following description when taken in connection with the accompanying drawing, which shows for purposes of illustration only, several embodiments in accordance with the present invention, and wherein.

Figure 1:
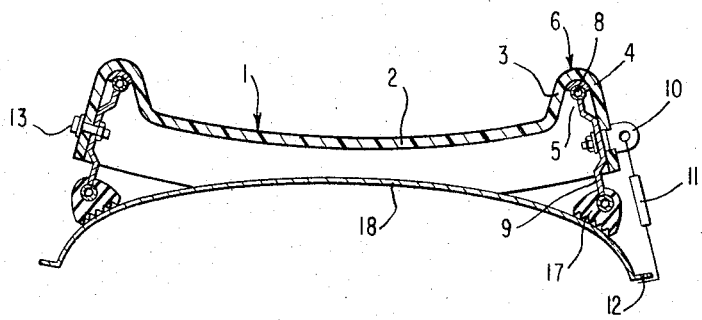
FIGURE 1 is a transverse cross-sectional view through a roof luggage carrier in accordance with the present invention, also indicating the roof of the vehicle.
Figure 2:
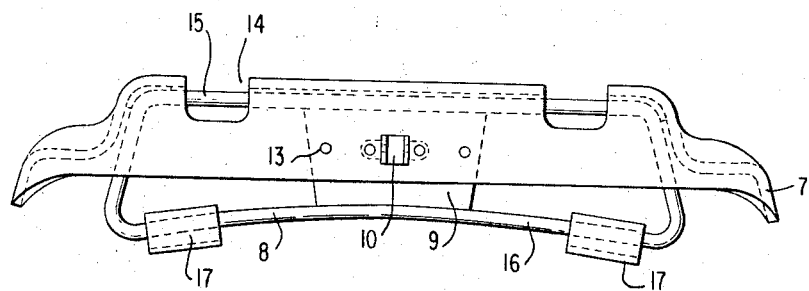
FIGURE 2 is a side elevational view of the roof luggage carrier of FIGURE 1, omitting any showing of the vehicle roof.

Referring now to the drawing wherein like reference numerals are used throughout the various views to designate like parts, and more particularly to FIGURES 1 and 2, the roof luggage carrier illustrated in these two figures is provided with a base body generally designated by reference numeral 1 and made of suitable, conventional plastic material which is constructed in its center part as a downwardly arched shell 2, i.e., as a concavely curved shell 2. The center part 2 is adjoined at both sides thereof by a rim 3 inclined slightly with respect to the vertical which is bent angularly with respect to the shell 2. Each rim 3, in turn, is again angularly bent by almost 180° into the part 4 whereby longitudinal channels 5 are formed. The ribs generally designated by reference numeral 6 and formed by the webs 3 and 4 which are disposed above the shell 2 and are provided with the longitudinal channels 5, extend, as is clearly visible from FIGURE 2, only over the two longitudinal sides of the roof luggage carrier.

The shell 2 is open in front and in the rear thereof in order that water that may possibly get on the luggage carrier can flow off or drain off therefrom; however, as is clearly visible from FIGURE 2, an angularly downwardly bent rib 7 extends downwardly at each of the two ends of the luggage carrier. Endless tubular bow-shaped stays 8 are inserted into the longitudinal channels 5 of the ribs 6 which are provided in the center with a securing plate 9 that is welded between the tubular bow-shaped elements or is secured thereat in any other suitable manner. Lugs 10, which are threaded through the lateral webs 4, are secured at this plate 9; conventional, suitable clamping or tightening means 11 are inserted into the lugs 10 which serve for securing and clamping the luggage carrier at the water-deflecting or rain-channel rims 12 of the roof. For the further securing of the base body 1 of the luggage carrier together with the tubular stays 8 at the vehicle, additional screws or bolts 13 may also be provided. The longitudinal ribs 6 are provided within the area of the ends thereof with apertures 14 which permit to tie securing straps or the like about the upper tubular members 15 of the tubular stays or framework 8. The lower parts of the tubular stays 8 are provided with rubber feet 17 which rest on the roof 18.

The base body 1 need not be made of plastic material but may also be made of sheet metal. However, if the base body 1 is made of plastic material, it can also be constructed so as to be transparent. The base body in accordance with the present invention may be installed and placed on every normal plane, convex or concavely curved vehicle roof.

Figures 3, 4:
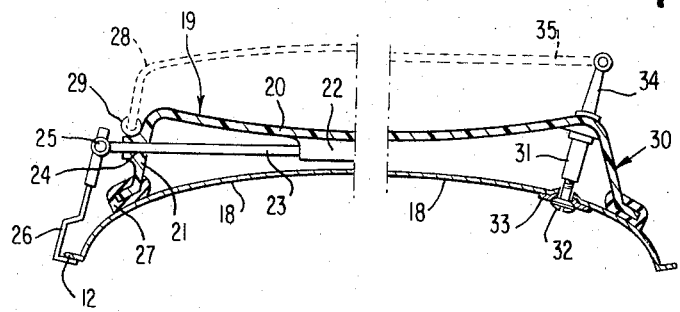
FIGURE 3 is a partial transverse cross-sectional view illustrating one-half of a modified embodiment of a roof luggage carrier in accordance with the present invention, the other half being of mirror-image-like construction.
FIGURE 4 is a partial transverse cross-sectional view through one-half of a still further modified embodiment of a roof luggage carrier in accordance with the present invention, the other side being again of a mirror-image-like construction.

With the embodiment illustrated in FIGURE 3, the base body generally designated by reference numeral 19 also comprises a concavely arched shell 20, from which extend only downwardly angularly bent web portions 21. Tubular members or stays for securing and supporting the shell 20 are not provided in this embodiment; however, the shell 20 is provided in the center with a reinforcement 22 from which a tubular member 23 extends toward both sides and is guided through eye portions 24 formed in the lateral wall web portions 21. Conventional securing and clamping means 26 are again pivotally connected at the ends 25 of the tubular member 23; the clamping means engage underneath the water-channel rim 12 of the roof 18 in a well-known manner and thereby clamp tightly the luggage carrier provided with a rubber strip 27 extending peripherally about the entire luggage carrier. The rubber strip 27, however, may be arranged only at the longitudinal ribs or at parts thereof. In order to form a tight luggage space, a cover shell 28 may be provided as indicated in dash line in FIGURE 3 which is provided with a sealing strip 29 at its rim by means of which it rests on the base body of the luggage carrier 19.

The base body of the luggage carrier generally designated by reference numeral 30 according to FIGURE 4 resembles that of FIGURE 3, only the securing means is made in a different manner in this embodiment in that tubular shaped sleeves 31 are provided on the inside of the luggage carrier into which are threaded screws or bolts extending through the roof 18 which are supported below the roof by reinforcing washers 33. The sleeves 31 may be extended through the base body of the luggage carrier 30 toward the outside into support feet 34 for a luggage gallery or step 35 indicated in dash line.

Figures 5, 6:
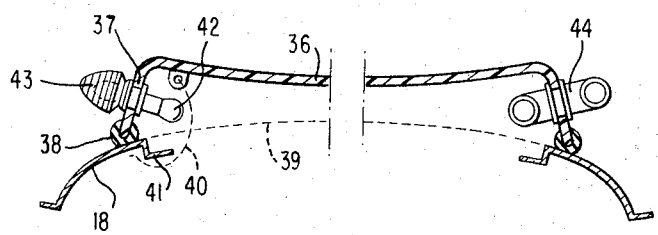
FIGURE 5 is a partial transverse cross-sectional view through still a further modified embodiment of a roof luggage carrier in accordance with the present invention, the other half being of mirror-image-like construction.
FIGURE 6 is a partial transverse cross-sectional view through still another modified embodiment of a roof luggage carrier in accordance with the present invention, the other half being of mirror-image-like construction.

The embodiment illustrated in FIGURE 5 is also provided with a concavely arched shell 36 having approximately vertically downwardly bent web portions 37 which abut by means of a sealing strip 38 on the roof 18 of the motor vehicle and which are sealed with respect thereto. There is provided in the roof 18 a conventional sun roof aperture 39, however, without special closing elements which is covered by the luggage carrier 36 consisting of plastic material. The luggage carrier is securely clamped with the aid of bow-shaped spring members or straps 40, illustrated only schematically in dash line, at the rim 41 of the aperture 39. Thus, with the aid of the roof luggage carrier according to the present invention, a sun roof aperture present in the vehicle may be closed in a simple manner and, giving up the light entry through the roof, possibly made of transparent material, the roof may be loaded with luggage. Additionally, an interior light 42 and a position or turn-indicator light 43 may be accommodated externally in an extraordinarily simple manner at the vertical web portions 37 which lights may be equipped with a common socket and with a common current supply line. Thus, there exists a simple possibility to assure additionally a good lighting for the vehicle interior space and a position safe-guarding of the vehicle.

The embodiment of FIGURE 6 has the same roof aperture and the same construction of the luggage carrier as that of FIGURE 5. However, in the place of the lights, an air duct or channel 44 is provided which may be arranged as air inlet and air discharge at the front and at the rear each of the luggage carrier or diagonally thereat, and thus also enables with existing vehicles provided with a sun roof aperture, a completely satisfactory and additional ventilation in the closed condition of this aperture.

Figure 7:
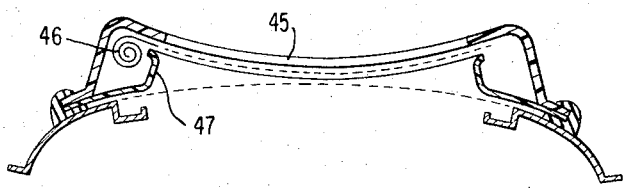
FIGURE 7 is a transverse cross-sectional view through a roof luggage carrier in accordance with the present invention provided with a roller blind-like sun roof.

The embodiment illustrated in FIGURE 7 shows a luggage carrier constructed in a manner similar to those described hereinabove and placed by means of a sealing strip on a convexly curved, conventional vehicle roof provided with a sun roof aperture. However, the roof luggage carrier according to FIGURE 7 is provided with an additional aperture 45 which can be closed with the aid of a roller-blind 46 of any conventional, known construction. For covering the roller blind mechanism, internal sheet metal elements 47 are provided.

While I have shown and described several embodiments in accordance with the present invention, it is understood that the same is not limited thereto but is susceptible of numerous changes and modifications as known to a person skilled in the art. For example, different shapes and configurations of the rims of the luggage carrier and additional equipment may be provided for each luggage carrier illustrated herein. Thus, I do not wish to be limited to the details shown and described herein but intend to cover all such changes and modifications as are encompassed by the scope of the appended claims.

I claim:

1. A detachable luggage carrier for the roof of a motor vehicle, said carrier comprising a unitary, concavely curved shell structure, the concavity of said curved shell structure facing upwardly, said concavity constituting the base body of the luggage carrier and said shell structure further including rim portions terminating in downwardly extending web portions, and supporting means including said web portions for supporting said shell structure on said roof, said support means further including rubber strip means in contact with said web portions and said vehicle roof.

2. A detachable luggage carrier as in claim 1, wherein said web portions include apertures, said shell structure further includes support members mounted to the underside of said shell structure and extending transversely to said rim portions, and the ends of said support member extending through said apertures and having clamping means for securing said shell structure to said roof.

3. A detachable luggage carrier according to claim 1, said roof and said luggage carrier having aligned apertures and further comprising means mounted in said luggage carrier selectively enabling closure of said roof aperture.

4. A detachable luggage carrier according to claim 1, said rim portions having rib means defining longitudinal channels, said support means further comprising said means including said web portions further including tubular frame means arranged along both longitudinal sides of the luggage carrier, said tubular frame means including an upper tubular member on each of said longitudinal sides and disposed in a respective one of said longitudinal channels.

5. A detachable luggage carrier according to claim 4, said longitudinal rib means in said shell structure being provided with apertures to expose portions of said upper tubular member.

6. A detachable luggage carrier for the roof of a motor vehicle, said carrier comprising a unitary, concavely curved shell structure, the concavity of said curved shell structure facing upwardly, said concavity constituting the base body of the luggage carrier and said shell structure further including rim portions terminating in downwardly extending web portions, supporting means including said web portions for supporting said shell structure on said roof, and said supporting means further comprising bolt means extending through said roof, threaded sleeve means cooperating with said bolt means and fastened to said shell structure.

7. A detachable luggage carrier as in claim 6, wherein said sleeve means extends upwardly above said rim portions and further comprising a luggage gallery supported by said sleeve means.

References Cited

UNITED STATES PATENTS

| | | | |
|---|---|---|---|
| 1,599,565 | 9/1926 | Girl | 224—42.06 |
| 2,080,601 | 5/1937 | Cappuccio | 4—173 |
| 2,714,480 | 8/1955 | Harris | 224—42.1 |
| 3,095,129 | 6/1963 | Kerr | 224—42.1 |

FOREIGN PATENTS 1,367,743  6/1964  France.

GERALD M. FORLENZA, *Primary Examiner.*

F. WERNER, *Assistant Examiner.*